(12) United States Patent
Kim et al.

(10) Patent No.: US 7,154,568 B2
(45) Date of Patent: Dec. 26, 2006

(54) LIQUID CRYSTAL DISPLAY PANEL WITH STATIC ELECTRICITY PREVENTION CIRCUIT

(75) Inventors: Byeong Koo Kim, Kumi-shi (KR); Yong Min Ha, Kumi-shi (KR); Han Wook Hwang, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/600,757

(22) Filed: Jun. 23, 2003

(65) Prior Publication Data

US 2004/0032544 A1 Feb. 19, 2004

(30) Foreign Application Priority Data

Aug. 13, 2002 (KR) .................. 10-2002-0047867

(51) Int. Cl.
*G02F 1/1333* (2006.01)
(52) U.S. Cl. .................... 349/40; 349/54; 349/192
(58) Field of Classification Search ............ 349/40, 349/192, 54–55
See application file for complete search history.

(56) References Cited

U.S. PATENT DOCUMENTS 6,072,550 A * 6/2000 Kim ................. 349/40
6,175,394 B1 * 1/2001 Wu et al. ............ 349/40
6,753,836 B1 * 6/2004 Kwon ............... 345/87
2002/0057392 A1 * 5/2002 Ha ................. 349/40
2004/0032544 A1 * 2/2004 Kim et al. .......... 349/40

FOREIGN PATENT DOCUMENTS

| JP | 9080471 | 3/1997 |
| JP | 11-295684 | 10/1999 |
| KR | 1020020044420 A | 6/2002 |

* cited by examiner

*Primary Examiner*—Andrew Schechter
*Assistant Examiner*—Phu Vu
(74) *Attorney, Agent, or Firm*—McKenna Long & Aldridge

(57) ABSTRACT

The present invention relates to a static electricity prevention type liquid crystal display panel for preventing static electricity flowing in through a pad part. A static electricity prevention type liquid crystal display panel according to an embodiment of the present invention includes a picture display part having a plurality of liquid crystal cells; a signal pad part applying a drive signal to be inputted to signal lines of the picture display part, and wherein the signal pad part includes a plurality of pads connected to the signal lines; and a static electricity prevention circuit having a thin film transistor with a floating gate for connecting the pad with a shorting bar by a static electricity flowing into the pad for the pad to form an equipotential with respect to the static electricity.

30 Claims, 12 Drawing Sheets

LIQUID CRYSTAL DISPLAY PANEL WITH STATIC ELECTRICITY PREVENTION CIRCUIT

This application claims the benefit of Korean Patent Application No. 2002-47867, filed on Aug. 13, 2002, which is hereby incorporated by reference for all purposes as if fully set forth herein.

BACKGROUND OF THE INVENTION

1. Field of the Invention

The present invention relates to a liquid crystal display panel, and more particularly to a static electricity prevention type liquid crystal display panel that is adaptive for preventing static electricity from flowing through a pad part.

2. Discussion of the Related Art

A general liquid crystal display device displays pictures by controlling light transmittance of liquid crystal using an electric field. To this end, the liquid crystal display device includes a liquid crystal display panel, where liquid crystal cells are arranged in a matrix, and a drive circuit for driving the liquid crystal display panel.

The liquid crystal display panel includes a thin film transistor array substrate and a color filter array substrate, which are opposite to and spaced apart from each other and bonded together, spacers sustaining a designated cell gap between the two substrates, and a liquid crystal injected into the cell gap.

The thin film transistor array substrate includes gate lines and data lines, a thin film transistor formed as a switching device at each crossing area of the gate lines and the data lines, and a pixel electrode formed at each liquid crystal cell and connected to the thin film transistor. The gate lines and the data lines receive signals from gate circuits through pad parts, respectively. The thin film transistor applies a pixel voltage signal supplied to the data line to a pixel electrode in response to a scan signal supplied to the gate line.

The color filter array substrate includes a color filter formed at each liquid crystal cell, a black matrix partitioning off the color filters and blocking or reflecting external light, and a common electrode commonly applying a reference voltage to the liquid crystal cells.

The thin film transistor and the color filter array substrate are fabricated separately and bonded together, and then the liquid crystal is injected therebetween to complete the liquid crystal display panel.

The completed liquid crystal display panel goes through inspection processes such as a lighting-up test in order to detect the presence of defects. The liquid crystal display panel, as illustrated in FIG. 1 and FIG. 2, includes test pad parts 8, 18 and 20 for applying test signals for the inspection process.

A liquid crystal display panel 2 illustrated in FIG. 1 includes a picture display part 4 provided with a plurality of liquid crystal cells, a link pad part 6 formed at an outer area of the picture display part 4 and connected to a drive circuit (not shown), and a test pad part 8 used in the inspection process.

The link pad part 6 shown in FIG. 1 is connected to signal lines of the picture display part 4. The link pad part 6 applies the drive signal from an external drive circuit to the signal lines of the picture display part 4.

The test pad part 8 includes a plurality of test pads connected to the signal lines of the picture display part 4 and is formed separately from the link pad part 6. The test pad part 8 applies the test signals supplied in the inspection process of the liquid crystal display panel 2 and bias voltages supplied in an aging process to the signal lines of the picture display part 4.

The liquid crystal display panel 12 illustrated in FIG. 2 includes a picture display part 14 provided with a plurality of liquid crystal cells, a link pad part 16 formed at an outer area of the picture display part 14 and connected to a drive circuit (not shown), and test pad parts 18 and 20 used in the inspection process.

The test pad parts 18 and 20 illustrated in FIG. 2 includes a plurality of test pads connected to signal lines of the picture display part 14, and are formed to be integrated with the link pad part 16 on both sides of the link pad part 16. The test pad part 14 applies test signals supplied in the inspection process of the liquid crystal display panel 12 and bias voltages supplied in an aging process to the signal lines of the picture display part 14.

In fact, the test pad part, as illustrated in FIG. 3, includes a plurality of test pads 32 and a static electricity prevention circuit 36 connected to each of the test pads 32.

The test pads 32 illustrated in FIG. 3 are connected to the signal lines of the picture display part. Each static electricity prevention circuit 36 is connected between the test pad 32 and a first and second drive voltage supply line VSSL and VDDL. More specifically, the static electricity prevention circuit 36 consists of a first diode D1 connected between the first drive voltage supply line VSSL and the output terminal of the test pad 32, and a second diode D2 connected between the output terminal of the test pad 32 and the second drive voltage supply line VDDL. The static electricity prevention circuit 36, when static electricity flows through the test pads 32, is driven to cause the static electricity not to flow into the liquid crystal display panel and to bypass through the first and second drive voltage supply lines VDDL, VSSL, thereby protecting the picture display part in the liquid crystal display panel from the static electricity.

However, in the test pads with such a configuration, the test pads 32 are formed independently, thus an equipotential cannot be formed between the test pads 32. Due to this, in a fabricating process and an inspection process of the liquid crystal display panel, the static electricity flowing through the test pads 32 is not completely bypassed through the static electricity prevention circuit 36 and the first and second drive voltage supply lines VDDL and VSSL and transmitted into the liquid crystal display panel.

FIG. 4 illustrates another configuration of a test pad part.

The test pad part shown in FIG. 4 includes a plurality of test pads 42, a static electricity prevention circuit 46 connected to each test pad 42, and a shorting bar 44 commonly connected to the test pads 42.

The test pads 42 shown in FIG. 4 are connected to the signal lines of the picture display part and commonly connected to the shorting bar 44. The static electricity prevention circuit 46 is connected between the test pad 42 and the first and second drive voltage supply lines VSSL and VDDL. More specifically, the static electricity prevention circuit 46 includes a first diode D1 connected between the first drive voltage supply line VSSL and the output terminal of the test pad 42, and a second diode D2 connected between the output terminal of the test pad 42 and the second drive voltage supply line VDDL. The static electricity prevention circuit 46, when the static electricity flows through the test pads 42, is driven to cause the static electricity not to flow into the liquid crystal display panel and to bypass through the first and second drive voltage supply lines VDDL and VSSL. Accordingly, the static electricity prevention circuit 46 protects the picture display part in the liquid crystal display panel from the static electricity. Specifically, the test pads 42 have equipotential via the shorting bar 44. Accordingly, before the shorting bar 44 is removed in a scribing process, the static electricity flowing into the test pads 42 is diffused to the test pads 42 that form equipotential, thereby being bypassed more rapidly through the static electricity prevention circuit 36 and the first and second drive voltage supply lines VDDL and VSSL.

However, the test pad part illustrated in FIG. 4, after the shorting bar 44 is removed in the scribing process, has test pads 42 separated as shown in FIG. 3, thus the equipotential of the test pads 42 is no longer formed. Due to this, in the subsequent processes and the lighting-up test carried out after the scribing process, the static electricity flowing through the test pads 42 are not completely bypassed through the static electricity prevention circuit 46 and the first and second drive voltage supply lines VDDL and VSSL, but are transmitted into the liquid crystal display panel.

FIG. 5 illustrates still another configuration of the test pad part.

The test pad part illustrated in FIG. 5 includes a plurality of test pads 52, a plurality of static electricity prevention circuits 56 each connected to each inspection pad 52, respectively, a shorting bar 54 commonly connected to the test pads 52, and resistors R each connected between each test pad 52 and the shorting bar 54.

The test pads 52 illustrated in FIG. 5 are connected to signal lines of the picture display part and commonly connected to the shorting bar 54 through the resistors R. The static electricity prevention circuit 56 is connected between the test pad 52 and the first and second drive voltage supply lines VSSL and VDDL. More specifically, the static electricity prevention circuit 56 includes a first diode connected between the first drive voltage supply line VSSL and the output terminal of the test pad 52, and a second diode connected between the output terminal of the test pad 52 and the second drive voltage supply line VDDL. The static electricity prevention circuit 56, when the static electricity flows through the test pads 52, is driven to cause the static electricity not to flow into the liquid crystal display panel but to bypass through the first and second drive voltage supply lines VDDL, VSSL. Accordingly, the static electricity prevention circuit 56 protects the thin film transistor array inside the liquid crystal display panel from the static electricity. In addition, the static electricity flowing into the test pad 52 is made to bypass to the shorting bar 54 through the resistor R before the shorting bar 54 is removed in a grinding process.

However, because the connection is made through the resistor R, there is a limit for the static electricity flowing into the test pad 52 to be bypassed to the shorting bar 54, thereby allowing the static electricity to be transmitted into the liquid crystal display panel.

In this way, the test pad part of the related art does not effectively protect the thin film transistor inside the liquid crystal display panel from the static electricity flowing into the test pad in the fabricating process and the inspection process of the liquid crystal display panel even though the test pad is connected to the first and second drive voltage supply lines VDDL and VSSL.

SUMMARY OF THE INVENTION

Accordingly, the present invention is directed to a liquid crystal display panel with static electricity prevention circuit that substantially obviates one or more of the problems due to limitations and disadvantages of the related art.

Accordingly, it is an advantage of the present invention to provide a static electricity prevention type liquid crystal display panel for preventing static electricity flowing through a pad part.

Additional features and advantages of the invention will be set forth in the description that follows, and in part will be apparent from the description, or may be learned by practice of the invention. These and other advantages of the invention will be realized and attained by the structure particularly pointed out in the written description and claims hereof, as well as the appended drawings.

In order to achieve these and other advantages of the invention, a static electricity prevention type liquid crystal display panel according to an aspect of the present invention includes a picture display part having a plurality of liquid crystal cells; a signal pad part for applying a driving signal to be inputted to signal lines of the picture display part, wherein the signal pad part includes a plurality of pads connected to respective ones of the signal lines; and a static electricity prevention circuit having a thin film transistor with a floating gate for connecting at least one of said pads with an equipotential line in the presence of static electricity.

Herein, the static electricity prevention circuit causes the pad to be insulated from the shorting bar and the other pads, when a normal drive signal is applied to the pad, so as to apply the drive signal to the signal lines of the picture display part.

The static electricity prevention circuit includes a first capacitor connected between the floating gate and a first terminal of the thin film transistor connected to the shorting bar; and a second capacitor connected between the floating gate and a second terminal of the thin film transistor connected to the pad.

The liquid crystal display further includes a second static electricity prevention circuit formed between the pad and a first and a second drive voltage supply line for bypassing the static electricity flowing into the pad to the first and second drive voltage supply lines.

Herein, the pad is connected to a node between the static electricity prevention circuit and the second static electricity prevention circuit through a link line that extends toward the shorting bar in a region to the outside of a grinding line used for removing the shorting bar from the pad, then bent at least once, and extends from the shorting bar toward the pad.

Herein, the pad is connected to the static electricity prevention circuit through a first link line that extends toward the shorting bar in a region to the outside of a grinding line used for removing the shorting bar from the pad, then bent at least once, and extends away from the shorting bar toward the pad, and the pad is connected to the second static electricity prevention circuit through a second link line that extends toward the shorting bar in a region to the outside of the grinding line, then bent at least once, and extends from the shorting bar toward the pad.

Herein, the pad is electrically separated from the static electricity prevention circuit, the second static electricity prevention circuit and the signal lines of the picture display part by the grinding process in which the shorting bar is removed.

The liquid crystal display further includes at least one resistor connected between the node and the signal lines of the picture display part for limiting current.

The liquid crystal display further includes at least one resistor connected between the second link line and the signal lines of the picture display part for limiting current.

The liquid crystal display further includes at least one resistor connected between the pad and the shorting bar.

Herein, the pad part includes a link pad part having a plurality of link pads that connect the signal lines of the picture display part with an external drive circuit; and a test pad part having a plurality of test pads connected to the signal lines of the picture display part for inspecting the liquid crystal display panel, and wherein the static electricity prevention circuit is connected to each of the test pads.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

Reference will now be made in detail to the embodiments of the present invention, examples of which are illustrated in the accompanying drawings.

Figure 6:
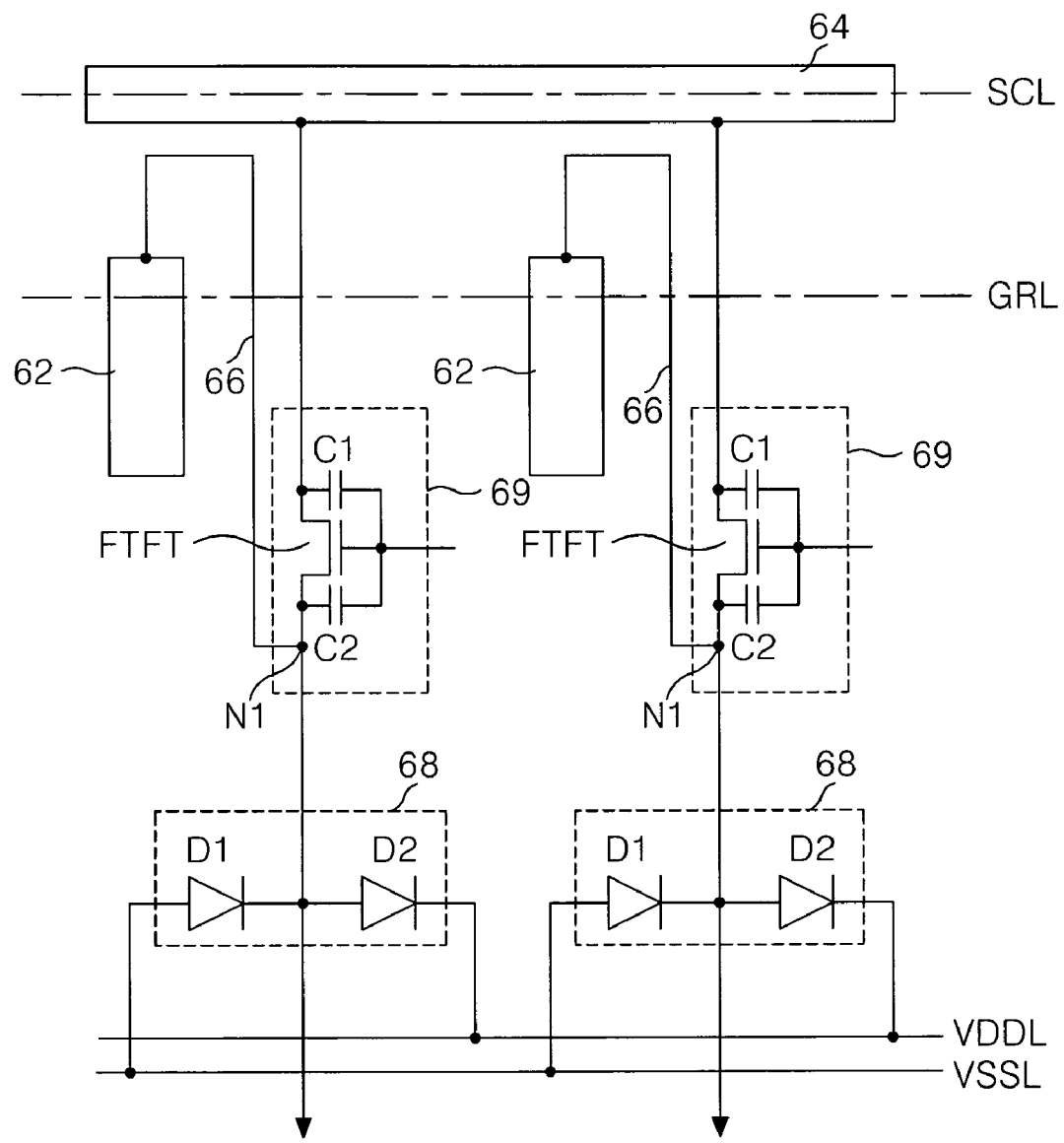
FIG. 6 is a diagram illustrating a test pad part of a liquid crystal display panel according to a first embodiment of the present invention.

FIG. 6 illustrates a test pad part of a liquid crystal display panel for preventing static electricity according to the first embodiment of the present invention.

Referring to FIG. 6, the test pad part includes a plurality of test pads 62, a first static electricity prevention circuit 68 connected between each test pad 62 and a first and a second drive voltage supply lines VDDL and VSSL, and a second static electricity prevention circuit 69 connected between each test pad 62 and a shorting bar 64.

The test pads 62 are connected to signal lines of a picture display part (not shown). The test pads 62 are used to apply a test signal during inspection processes such as a lighting-up test of the liquid crystal display panel, and at the same time to apply a bias voltage in an aging process for stabilizing the liquid crystal display panel.

The first static electricity prevention circuit 68 is connected between the test pad 62 and the first and second drive voltage supply lines VSSL and VDDL. More specifically, the first static electricity prevention circuit 68 includes a first diode D1 connected between the first drive voltage supply line VSSL and the output terminal of the test pad 62, and a second diode D2 connected between the output terminal of the test pad 62 and the second drive voltage supply line VDDL. The first static electricity prevention circuit 68 is driven when the static electricity flows in through the test pads 62, so that the static electricity does not flow into the liquid crystal display panel but is bypassed through the first and second drive voltage supply lines VDDL and VSSL. Accordingly, the first static electricity prevention circuit 68 protects the picture display part in the liquid crystal display panel from the static electricity.

The second static electricity prevention circuit 69 is connected between the test pad 62 and the shorting bar 64. The second static electricity prevention circuit 69 connects the test pad 62 with the shorting bar 64, when a static electricity of high voltage flows through the test pad 62 to cause an equipotential to be formed with respect to the static electricity among the test pads 62. Accordingly, the static electricity flowing into the test pad 62 is bypassed to the shorting bar 64 that forms the equipotential therewith. To this end, the second static electricity prevention circuit 69 includes a floating gate thin film transistor FTFT having its gate terminal in a floating state, its source terminal connected to the test pad 62 and its drain terminal connected to the shorting bar 64; a first capacitor C1 connected between the gate terminal and the drain terminal; and a second capacitor C2 connected between the gate terminal and the source terminal.

The gate terminal of the floating gate thin film transistor FTFT maintains at a floating state in which the gate terminal is not connected to a bias line. Thus the voltage of the gate terminal is changed in accordance with the voltage of the source terminal or the drain terminal. In other words, a floating gate voltage $Vg$ has a proportional relationship with the voltage $Vds$ between the drain and the source. As shown in FORMULA 1, the proportional rate thereof is determined by the capacitance of the first and second capacitors C1 and C2.

$$Vg = C1/(C1+C2)Vds \qquad \text{[FORMULA 1]}$$

Figure 7:
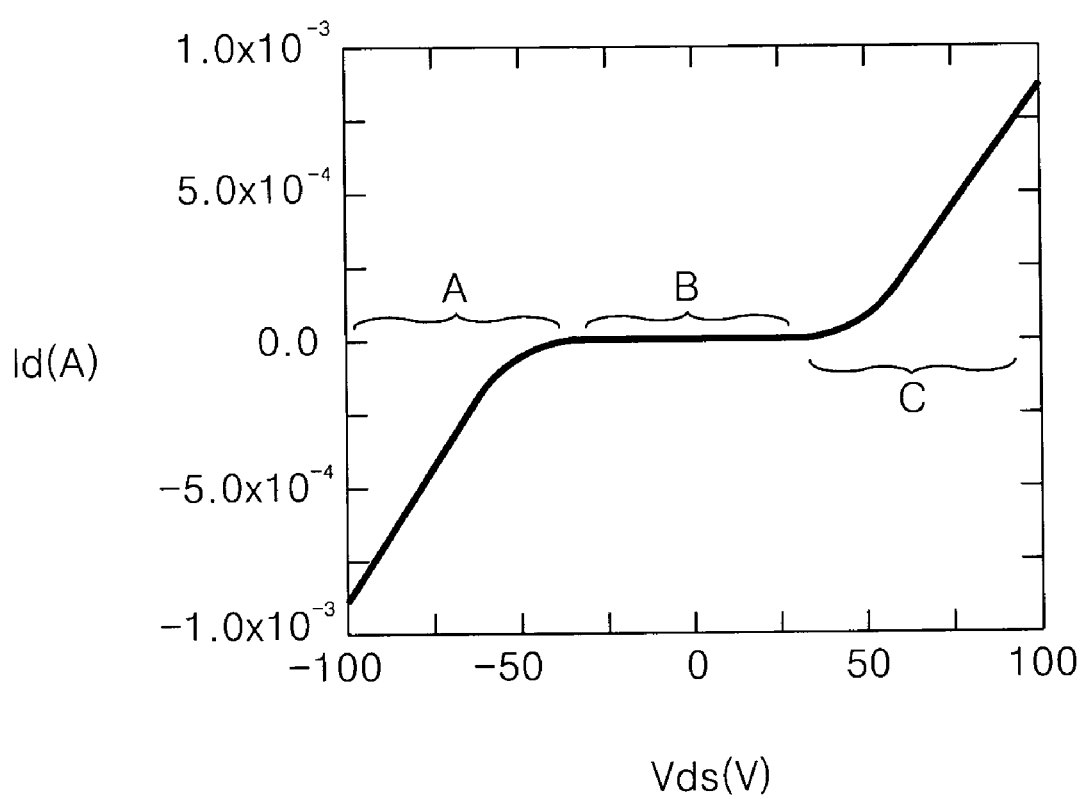
FIG. 7 is a graph illustrating an operation voltage scope of a floating gate thin film transistor illustrated in FIG. 6.

Accordingly, when static electricity flows through the test pad 62 to apply a high voltage to the source terminal, the gate voltage rises to turn on the floating gate thin film transistor. In other words, the floating gate thin film transistor FTFT is turned on because a channel resistance is reduced remarkably when a high voltage (e.g., of hundreds or more volts) is applied between the drain and the source, as in the area A and C of a graph shown in FIG. 7. Accordingly, the static electricity flowing into the test pad 62 is bypassed to the shorting bar 64 through the turned-on floating gate thin film transistor FTFT.

To the contrary, the floating gate thin film transistor FTFT is turned off when a normal drive voltage is applied through the test pad 62. In other words, the floating gate thin film transistor FTFT is turned off because the channel resistance of a few MΩ (megaohms) is sustained when a normal drive voltage of −20V<Vds<20V is applied between the drain and the source, as in the area B of a graph shown in FIG. 7. Accordingly, the normal drive voltage applied to the test pad 62 can be applied to the picture display part.

Figure 1:
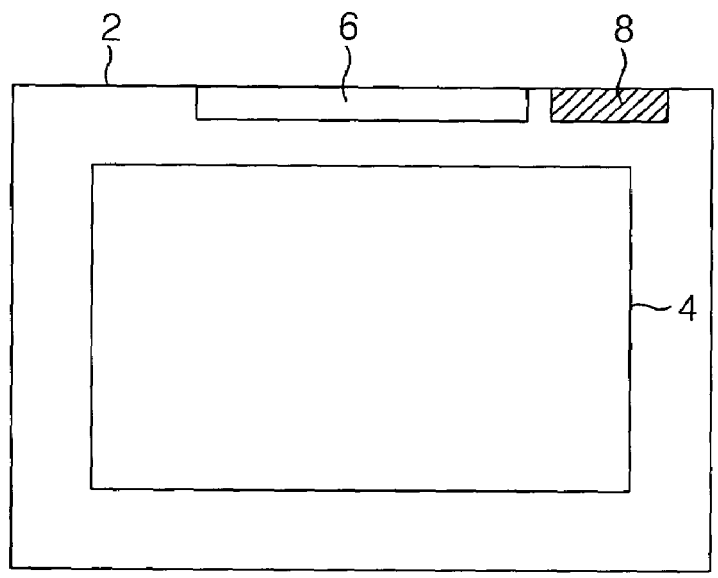
FIG. 1 is a plan diagram schematically illustrating a liquid crystal display panel with a general test pad part.
Figure 2:
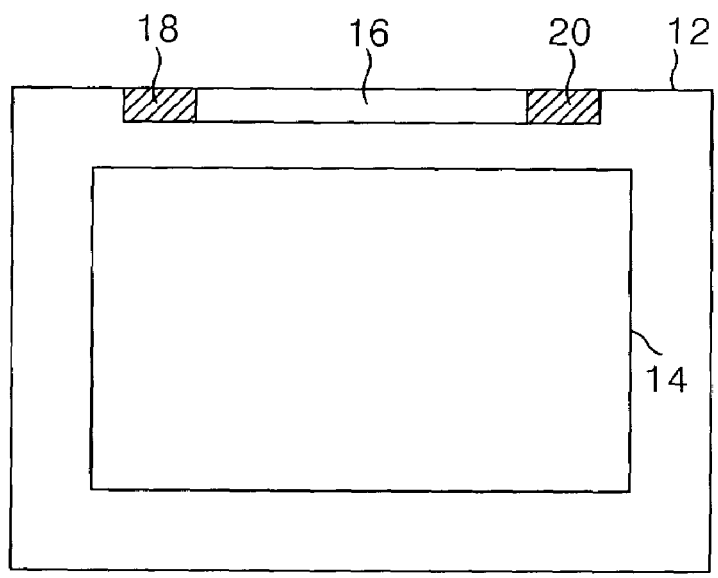
FIG. 2 is a plan diagram schematically illustrating a liquid crystal display panel with another test pad part.
Figure 3:
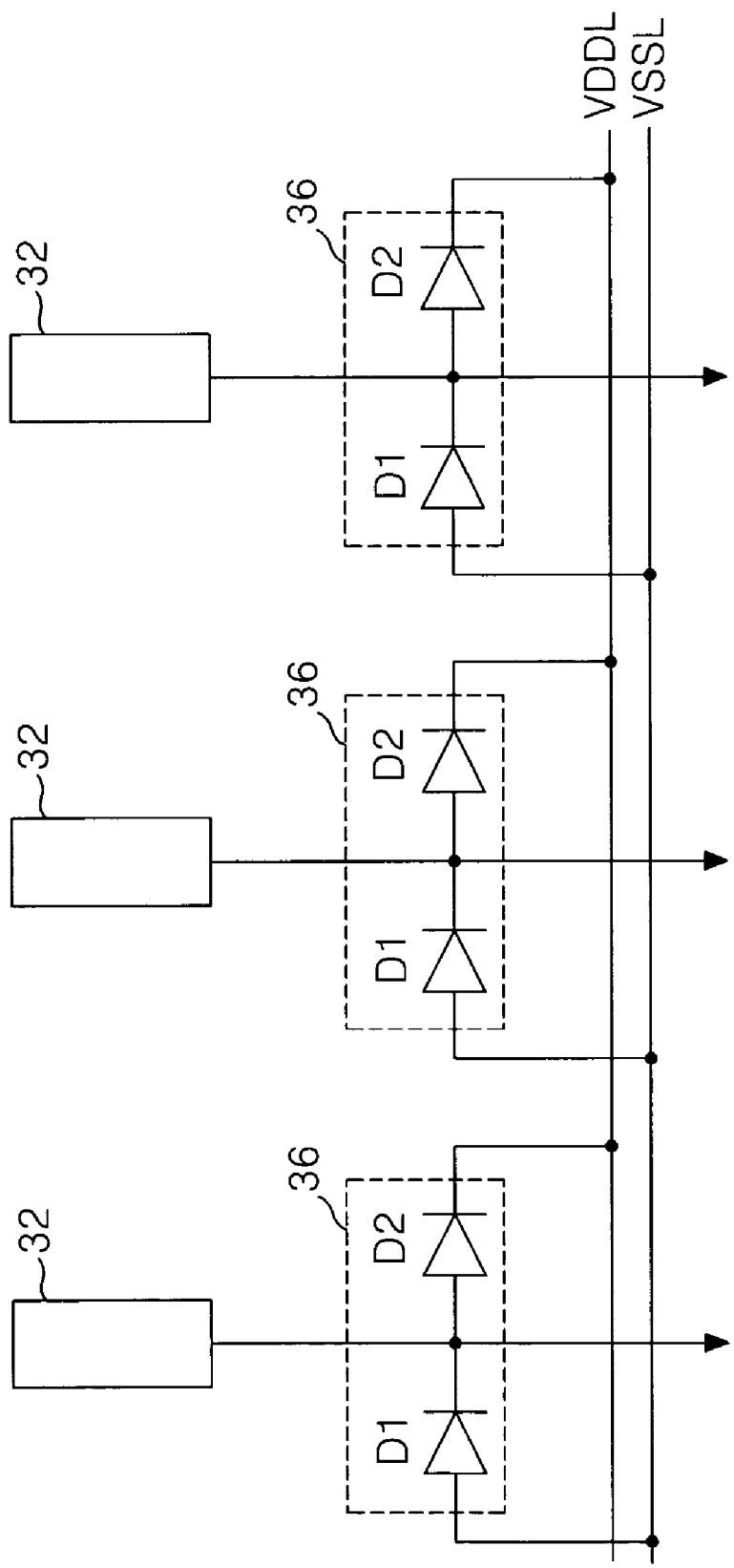
FIG. 3 is a diagram illustrating a test pad part including a related art static electricity prevention circuit.
Figure 4:
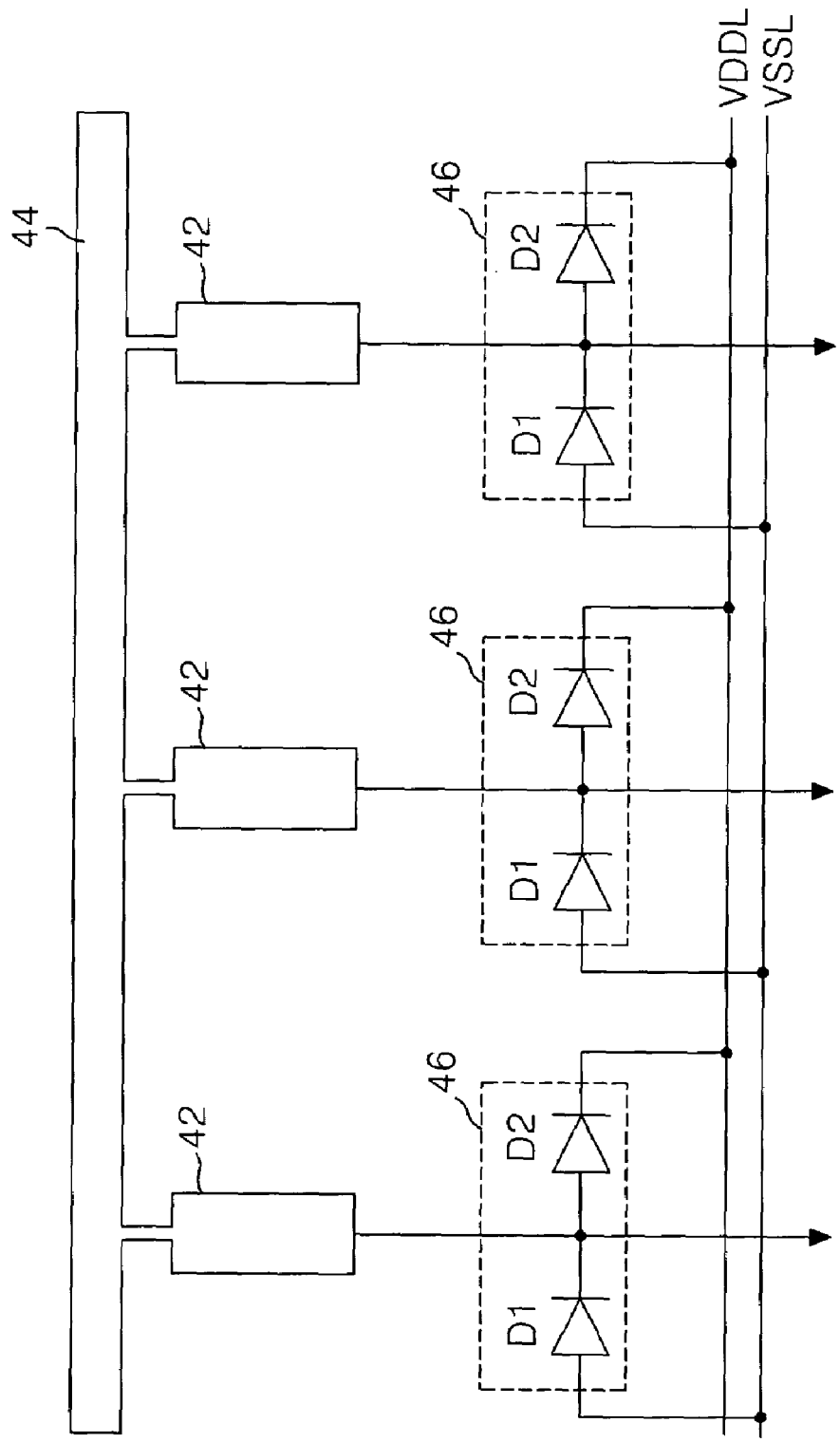
FIG. 4 is a diagram illustrating another test pad part including a related art static electricity prevention circuit.
Figure 5:
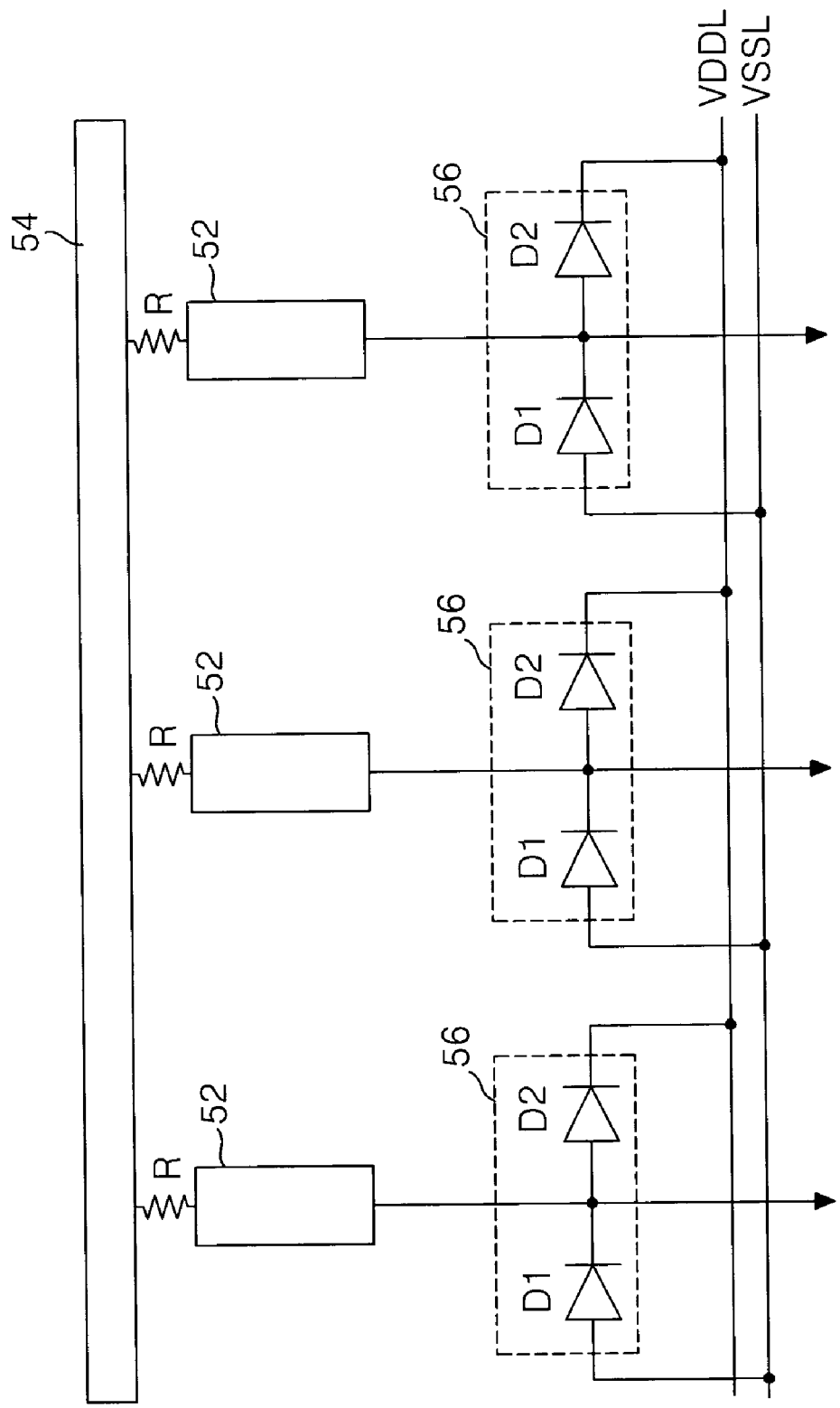
FIG. 5 is a diagram illustrating still another test pad part including a related art static electricity prevention circuit.

In this way, in the test pad part illustrated in FIG. 5, the first static electricity prevention circuit 68 and the second static electricity prevention circuit 69 are driven to cause the static electricity to be bypassed to the first and second drive voltage supply lines VSSL and VDDL when the static electricity flows into the test pad 62, and at the same time to be bypassed to the shorting bar 64. Accordingly, the static electricity through the test pad 62 can be prevented from flowing into the liquid crystal display panel, thereby protecting the picture display part from the static electricity.

More specifically, the test pad 62 has a structure where the test pad 62 is connected to the shorting bar 64 through the second static electricity prevention circuit 69 after a scribing process, in which a plurality of liquid crystal display panels manufactured in a body are separated one by one in accordance with the scribing line SCL. Accordingly, in an inspection process after the scribing process, the first and second static electricity prevention circuits 68 and 69 can also intercept the static electricity inflow through the test pad 62.

The test pad 62 is electrically separated from the first and second static prevention circuits 68, 69 and the signal lines of the picture display part in a grinding process where the shorting bar 64 is removed along a grinding line GRL. To this end, a first portion of a link line 66 electrically connecting the test pad 62 with a node N1 between the first and second static electricity prevention circuits 68 and 69 extends parallel to the test pad 62 and above the test pad 62, then bends twice outside of the grinding line GRL to be connected to the test pad 62 so that a second portion of the link line 66 extends parallel to the first portion of the link line 66 to be connected to a node N1 located between the test pad 62 and the picture display part (not shown). Accordingly, the link line 66 is made open by the grinding process to cause the test pad 62 to be electrically separated from the signal lines of the picture display part and at the same time to be electrically separated from the first and second static electricity prevention circuits 68 and 69. In this way, since the test pad 62 is separated electrically, the static electricity inflow through the test pad 62 is prevented after the grinding process.

Figure 8A:
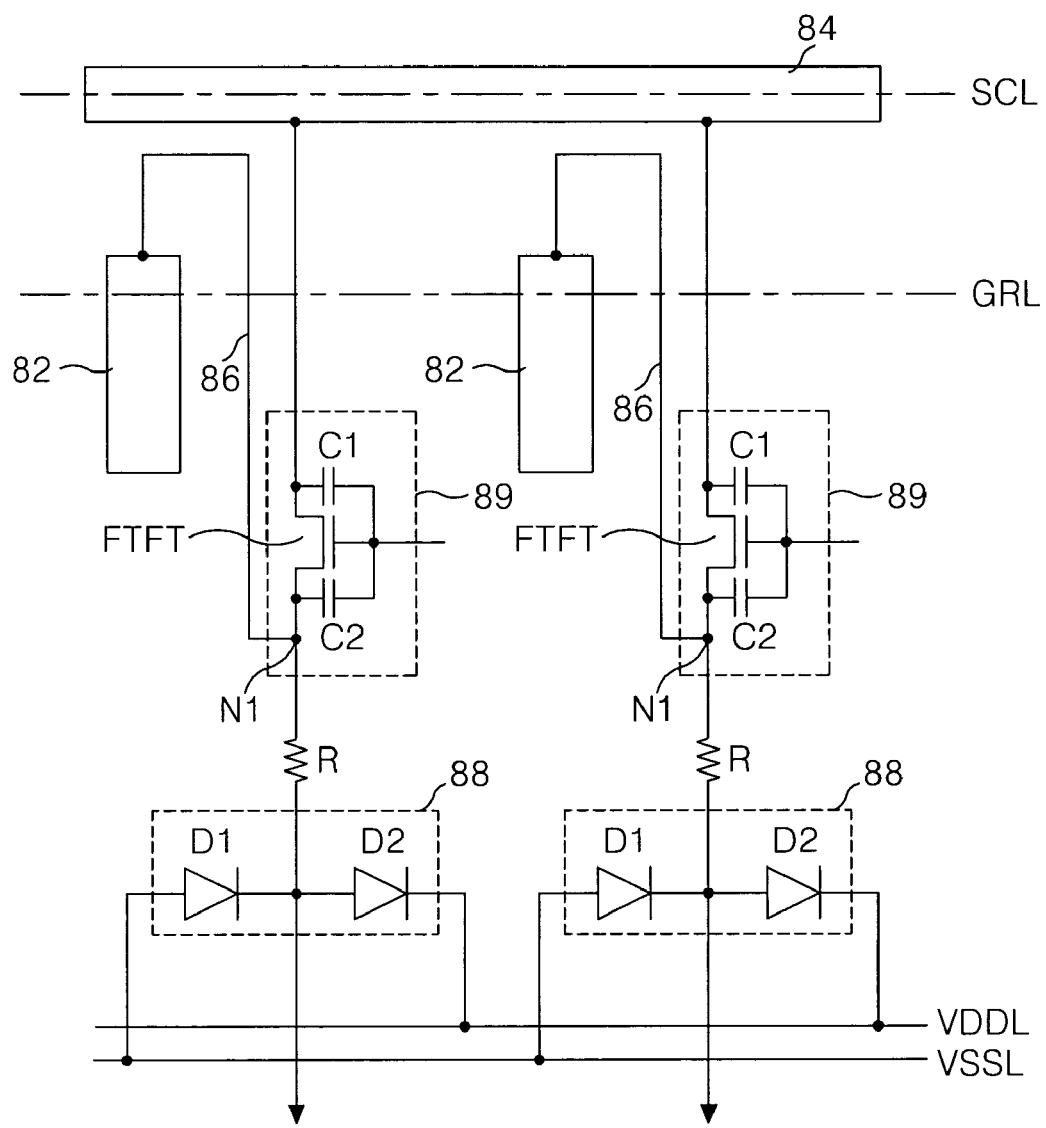
FIG. 8A is a diagram illustrating a test pad part of a liquid crystal display panel according to a second embodiment of the present invention.
Figure 8B:
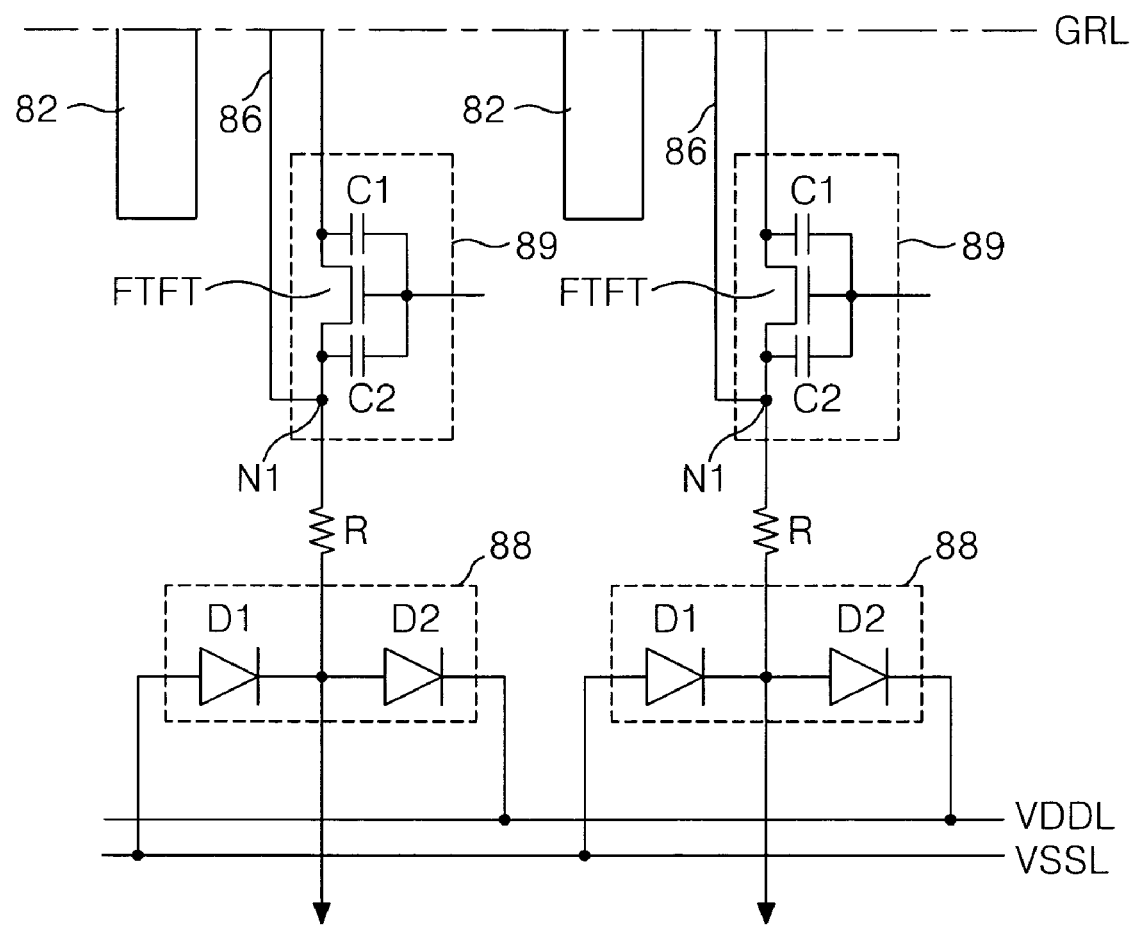
FIG. 8B is a diagram illustrating a test pad part illustrated in FIG. 8A after a grinding process.

FIG. 8A illustrates a test pad part of a static electricity prevention type liquid crystal display panel according to a second embodiment of the present invention. FIG. 8B illustrates a test pad part according to the second embodiment after a grinding process.

The test pad part illustrated in FIG. 8A includes the same components as the test pad part illustrated in FIG. 6 except that a resistor R is added between the first and second static electricity prevention circuits 88 and 89.

The test pads 82 are connected to the signal lines of the picture display part (not shown). The test pads 82 are used to apply a test signal in inspection processes such as a lighting-up test of the liquid crystal display panel, and at the same time to apply a bias voltage in an aging process for stabilizing the liquid crystal display panel.

The first static electricity prevention circuit 88 is connected between the test pad 82 and the first and second drive voltage supply lines VSSL and VDDL. More specifically, the first static electricity prevention circuit 88 includes a first diode D1 connected between the first drive voltage supply line VSSL and the output terminal of the test pad 82, and a second diode D2 connected between the output terminal of the test pad 82 and the second drive voltage supply line VDDL. The first static electricity prevention circuit 88 is driven when the static electricity flows in through the test pads 82, so that the static electricity does not to flow into the liquid crystal display panel but is bypassed through the first and second drive voltage supply lines VDDL and VSSL. Accordingly, the first static electricity prevention circuit 88 protects the picture display part in the liquid crystal display panel from the static electricity.

The second static electricity prevention circuit 89 is connected between the test pad 82 and the shorting bar 84. The second static electricity prevention circuit 89 connects the test pad 82 with the shorting bar 84 when a static electricity of high voltage flows in through the test pad 82 to cause an equipotential to be formed with respect to the static electricity among the test pads 82. Accordingly, the static electricity flowing into the test pad 82 is bypassed to the shorting bar 84 that forms the equipotential therewith. To this end, the second static electricity prevention circuit 89 includes a floating gate thin film transistor FTFT having its gate terminal in a floating state, its source terminal connected to the test pad 82 and its drain terminal connected to the shorting bar 84; a first capacitor C1 connected between the gate terminal and the drain terminal; and a second capacitor C2 connected between the gate terminal and the source terminal.

The gate terminal of the floating gate thin film transistor FTFT maintains at a floating state in which the gate terminal is not connected to a bias line. Thus the voltage of the gate terminal is changed in accordance with the voltage of the source terminal or the drain terminal. In other words, a floating gate voltage Vg has a proportional relationship with the voltage Vds between the drain and the source. As shown in the above FORMULA 1, the proportional rate thereof is determined by the capacitance of the first and second capacitors C1 and C2.

Accordingly, when static electricity flows through the test pad 82 to apply a high voltage to the source terminal, the gate voltage rises to turn on the floating gate thin film transistor. In other words, the floating gate thin film transistor FTFT is turned on because a channel resistance is reduced remarkably when a high voltage (e.g., of hundreds or more volts) is applied between the drain and the source. Accordingly, the static electricity flowing into the test pad 82 is bypassed to the shorting bar 84 through the turned-on floating gate thin film transistor FTFT.

To the contrary, the floating gate thin film transistor FTFT is turned off when a normal drive voltage is applied through the test pad 82. In other words, the floating gate thin film transistor FTFT is turned off because the channel resistance of a few MΩ(megaohms) is sustained when a voltage between the drain and the source is a normal drive voltage of −20V<Vds<20V. Accordingly, the normal drive voltage applied to the test pad 82 can be applied to the picture display part. Accordingly, the static electricity through the test pad 82 can be prevented from flowing into the liquid crystal display panel, thereby protecting the picture display part from the static electricity.

The resistor R connected between the first and second static electricity prevention circuits 88 and 89 limits the current flowing to the picture display part. Accordingly, in the event that the static electricity flowing into the test pad 82 is not completely bypassed through the first and second static electricity prevention circuits 88 and 89, but flows toward the picture display part, the current limit resistor R can minimize the influence on the picture display part caused by the static electricity. Herein, it is preferable for the current limit resistor R to have a resistance within the range of about 10 kΩ~1 MΩ.

The test pad 82 has a structure in which the test pad 82 is connected to the shorting bar 84 through the second static electricity prevention circuit 89 after a scribing process, in which a plurality of liquid crystal display panels manufactured in a body are separated one by one in accordance with the scribing line SCL. Accordingly, in an inspection process after the scribing process, the first and second static electricity prevention circuits 88 and 89 can also intercept the static electricity inflow through the test pad 82.

The test pad 82, as illustrated in FIG. 8B, is electrically separated from the first and second static prevention circuits 88, 89 and the signal lines of the picture display part in a grinding process where the shorting bar 84 is removed along a grinding line GRL. To this end, a first portion of a link line 86 electrically connecting the test pad 82 with a node N1 between the first and second static electricity prevention circuits 88 and 89 extends parallel to the test pad 82 and above the test pad 82, then bends twice outside of the grinding line GRL to be connected to the test pad 82 so that a second portion of the link line 86 extends parallel to the first portion of the link line 86 to be connected to a node N1 located between the test pad 82 and the picture display part (not shown). Accordingly, the link line 86 made open by the grinding process to cause the test pad 82 to be electrically separated from the signal lines of the picture display part and at the same time to be electrically separated from the first and second static electricity prevention circuits 88 and 89. In this way, since the test pad 82 is separated electrically, the static electricity inflow into the liquid crystal display panel through the test pad 82 is prevented after the grinding process.

Figure 9:
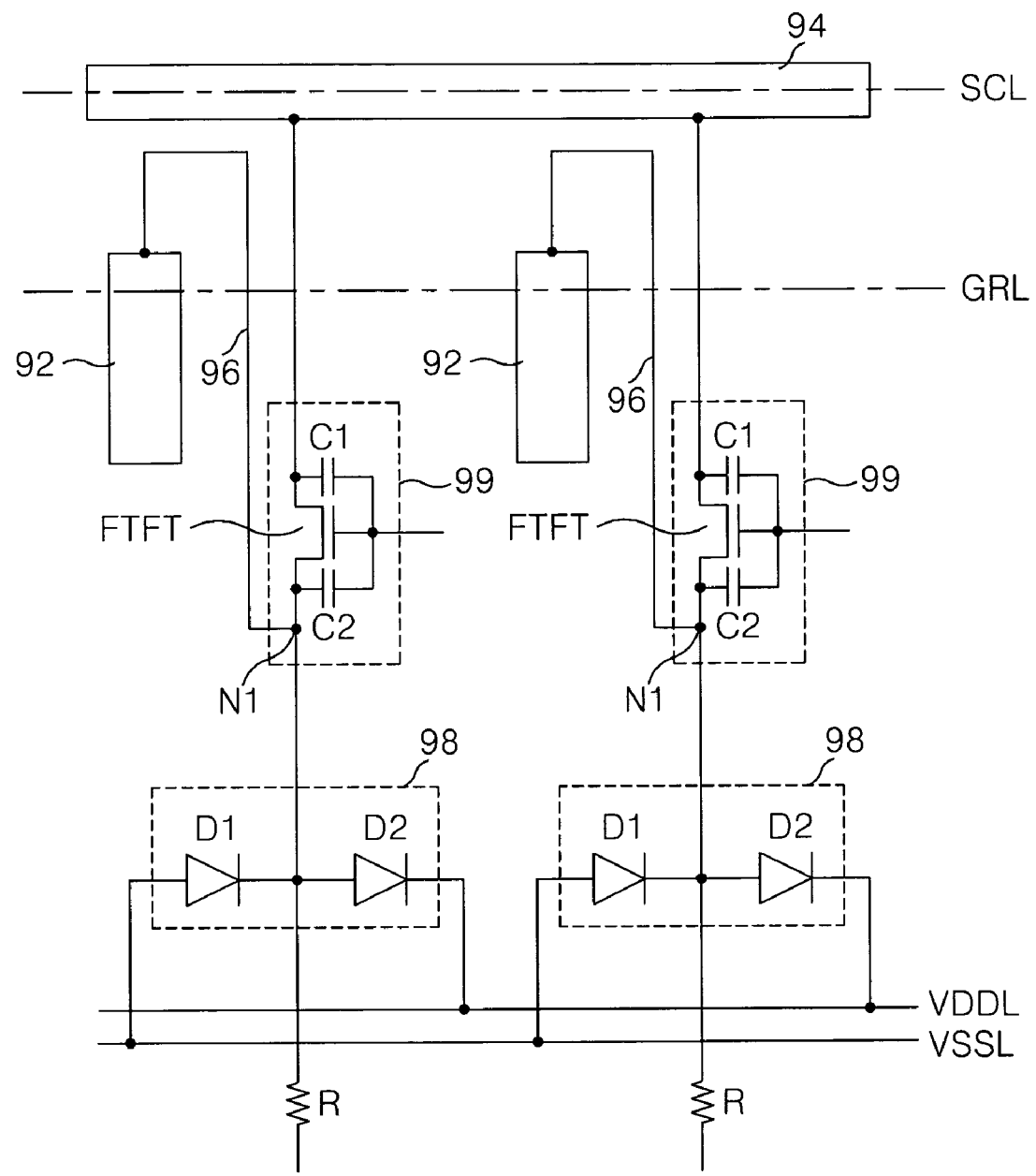
FIG. 9 is a diagram illustrating a test pad part of a liquid crystal display panel according to a third embodiment of the present invention.

FIG. 9 illustrates a test pad part of a static electricity prevention type liquid crystal display panel according to a third embodiment of the present invention.

The test pad part illustrated in FIG. 9 includes the same components as the test pad part shown in FIG. 8A, except that a current limit resistor R is formed between a first static electricity prevention circuit 98 and signal lines of the picture display part (not shown) instead of between the first and second static electricity prevention circuits 88 and 89.

The test pads 92 are connected to the signal lines of the picture display part (not shown). The test pads 92 are used to apply a test signal in inspection processes such as a lighting-up test of the liquid crystal display panel, and at the same time to apply a bias voltage in an aging process for stabilizing the liquid crystal display panel.

The first static electricity prevention circuit 98 is connected between the test pad 92 and the first and second drive voltage supply lines VSSL and VDDL. More specifically, the first static electricity prevention circuit 98 includes a first diode D1 connected between the first drive voltage supply line VSSL and the output terminal of the test pad 92, and a second diode D2 connected between the output terminal of the test pad 92 and the second drive voltage supply line VDDL. The first static electricity prevention circuit 98 is driven when the static electricity flows in through the test pads 92 so that the static electricity does not flow into the liquid crystal display panel but is bypassed through the first and second drive voltage supply lines VDDL and VSSL. Accordingly, the first static electricity prevention circuit 98 protects the picture display part in the liquid crystal display panel from the static electricity.

The second static electricity prevention circuit 99 is connected between the test pad 92 and the shorting bar 94.

The second static electricity prevention circuit 99 connects the test pad 92 with the shorting bar 94 when a static electricity of high voltage flows in through the test pad 92 to cause an equipotential to be formed with respect to the static electricity among the test pads 92. Accordingly, the static electricity flowing into the test pad 92 is bypassed to the shorting bar 94 that forms the equipotential therewith. To this end, the second static electricity prevention circuit 99 includes a floating gate thin film transistor FTFT having its gate terminal in a floating state, its source terminal connected to the test pad 92 and its drain terminal connected to the shorting bar 94; a first capacitor C1 connected between the gate terminal and the drain terminal; and a second capacitor C2 connected between the gate terminal and the source terminal.

The gate terminal of the floating gate thin film transistor FTFT maintains a floating state in which the gate terminal is not connected to a bias line. Thus the voltage of the gate terminal is changed in accordance with the voltage of the source terminal or the drain terminal. In other words, a floating gate voltage Vg has a proportional relationship with the voltage Vds between the drain and the source. As shown in the above FORMULA 1, the proportional rate thereof is determined by the capacitance of the first and second capacitors C1 and C2.

Accordingly, when static electricity flows through the test pad 92 to apply a high voltage to the source terminal, the gate voltage rises to turn on the floating gate thin film transistor. In other words, the floating gate thin film transistor FTFT is turned on because a channel resistance is reduced remarkably when a high voltage (e.g., hundreds or more volts) is applied between the drain and the source. Accordingly, the static electricity flowing into the test pad 92 is bypassed to the shorting bar 94 through the turned-on floating gate thin film transistor FTFT.

To the contrary, the floating gate thin film transistor FTFT is turned off when a normal drive voltage is applied through the test pad 92. In other words, the floating gate thin film transistor FTFT is turned off because the channel resistance of a few MΩ (megaohms) is sustained when a voltage between the drain and the source is a normal drive voltage of −20V<Vds<20V. Accordingly, the normal drive voltage applied to the test pad 92 can be applied to the picture display part.

In this way, in the test pad part illustrated in FIG. 9, in the event that the static electricity flows into the test pad 92, the first static electricity prevention circuit 98 and the second static prevention circuit 99 are driven so that the static electricity is bypassed to the first and second drive voltage supply lines VSSL and VDDL, and at the same time, bypassed to the shorting bar 94. Accordingly, the static electricity through the test pad 92 can be prevented from flowing into the liquid crystal display panel, thereby protecting the picture display part from the static electricity.

The resistor R connected between the second static electricity prevention circuit 99 and the signal line of the picture display part limits the current flowing to the picture display part. Accordingly, in the event that the static electricity flowing into the test pad 92 is not completely bypassed through the first and second static electricity prevention circuits 98 and 99, but flows toward the picture display part, the current limit resistor R can minimize the influence on the picture display part caused by the static electricity. Herein, it is preferable for the current limit resistor R to have a resistance within the range of about 10 kΩ~about 1 MΩ. The influence of the static electricity on the picture display part can be further minimized by adding the current limit resistor R between the first and second static electricity prevention circuits 98 and 99.

The test pad 92 has a structure where the test pad 92 is connected to the shorting bar 94 through the second static electricity prevention circuit 99 after a scribing process, in which a plurality of liquid crystal display panels manufactured in a body are separated one by one in accordance with the scribing line SCL. Accordingly, in an inspection process after the scribing process, the first and second static electricity prevention circuits 98 and 99 can also intercept the static electricity inflow through the test pad 92.

The test pad 92 is electrically separated from the first and second static prevention circuits 98, 99 and the signal lines of the picture display part in a grinding process during which the shorting bar 94 is removed along a grinding line GRL. To this end, a first portion of a link line 96 electrically connecting the test pad 92 with a node N1 between the first and second static electricity prevention circuits 98 and 99 extends parallel to the test pad 92 and above the test pad 92, then bends twice outside of the grinding line GRL to be connected to the test pad 92 so that a second portion of the link line 96 extends parallel to the first portion of the link line 96 to be connected to a node N1 located between the test pad 92 and the picture display part (not shown). Accordingly, the link line 96 made open by the grinding process to cause the test pad 92 to be electrically separated from the signal lines of the picture display part and at the same time to be electrically separated from the first and second static electricity prevention circuits 98 and 99. In this way, since the test pad 92 is separated electrically, the static electricity inflow into the liquid crystal display panel through the test pad 92 is prevented after the grinding process.

Figure 10:
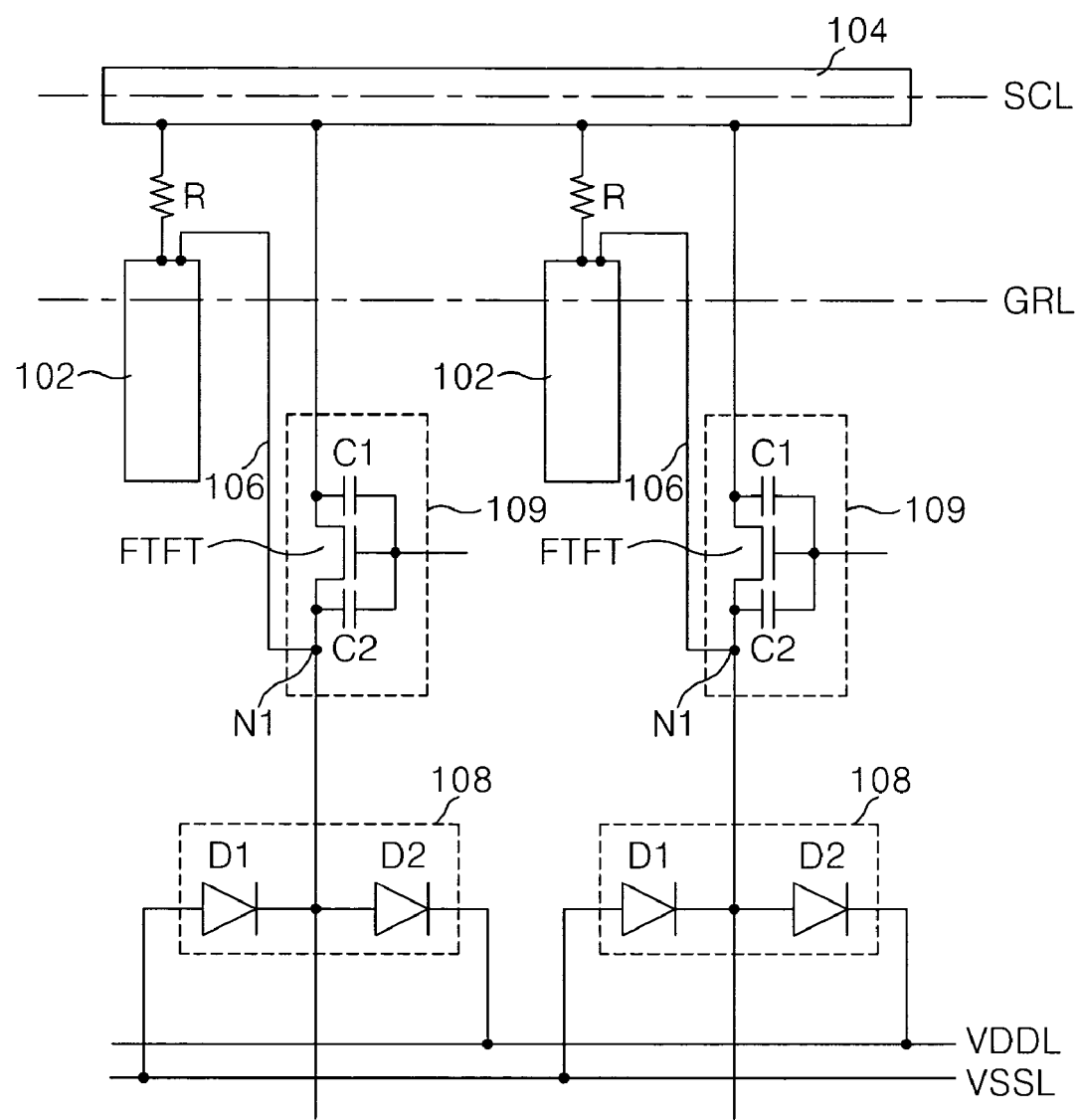
FIG. 10 is a diagram illustrating a test pad part of a liquid crystal display panel according to a fourth embodiment of the present invention.

FIG. 10 illustrates a test pad part of a static electricity prevention type liquid crystal display panel according to a fourth embodiment of the present invention.

The test pad part 102 in FIG. 10 includes the same components as the test pad part shown in FIG. 6 except that a test pad 102 is connected to a shorting bar 104 through a resistor R, as well as a second static electricity prevention circuit 109.

The test pads 102 are connected to the signal lines of the picture display part (not shown). The test pads 102 are used to apply a test signal in inspection processes such as a lighting-up test of the liquid crystal display panel, and at the same time to apply a bias voltage in an aging process for stabilizing the liquid crystal display panel.

The first static electricity prevention circuit 108 is connected between the test pad 102 and the first and second drive voltage supply lines VSSL and VDDL. More specifically, the first static electricity prevention circuit 108 includes a first diode D1 connected between the first drive voltage supply line VSSL and the output terminal of the test pad 102, and a second diode D2 connected between the output terminal of the test pad 102 and the second drive voltage supply line VDDL. The first static electricity prevention circuit 108 is driven when the static electricity flows in through the test pads 102 so that the static electricity does not flow into the liquid crystal display panel but is bypassed through the first and second drive voltage supply lines VDDL and VSSL. Accordingly, the first static electricity prevention circuit 108 protects the picture display part in the liquid crystal display panel from the static electricity.

The second static electricity prevention circuit 109 is connected between the test pad 102 and the shorting bar 104. The second static electricity prevention circuit 109 connects the test pad 102 with the shorting bar 104 when a static electricity of high voltage flows in through the test pad 102 to cause an equipotential to be formed with respect to the static electricity among the test pads 102. Accordingly, the static electricity flowing into the test pad 102 is bypassed to the shorting bar 104 that forms the equipotential therewith. To this end, the second static electricity prevention circuit 109 includes a floating gate thin film transistor FTFT having its gate terminal in a floating state, its source terminal connected to the test pad 102 and its drain terminal connected to the shorting bar 104; a first capacitor C1 connected between the gate terminal and the drain terminal; and a second capacitor C2 connected between the gate terminal and the source terminal.

The gate terminal of the floating gate thin film transistor FTFT maintains a floating state in which the gate terminal is not connected to a bias line. Thus the voltage of the gate terminal is changed in accordance with the voltage of the source terminal or the drain terminal. In other words, a floating gate voltage Vg has a proportional relationship with the voltage Vds between the drain and the source. As shown in the above FORMULA 1, the proportional rate thereof is determined by the capacitance of the first and second capacitors C1 and C2.

Accordingly, when static electricity flows through the test pad 102 to apply a high voltage to the source terminal, the gate voltage rises to turn on the floating gate thin film transistor. In other words, the floating gate thin film transistor FTFT is turned on because a channel resistance is reduced remarkably when a high voltage (e.g., hundreds or more volts) is applied between the drain and the source. Accordingly, the static electricity flowing into the test pad 102 is bypassed to the shorting bar 104 through the turned-on floating gate thin film transistor FTFT. In addition, the static electricity flowing into the test pad 102 is also bypassed to the shorting bar 104 through the resistor R, thereby causing the static electricity to be bypassed more rapidly.

To the contrary, the floating gate thin film transistor FTFT is turned off when a normal drive voltage is applied through the test pad 102. In other words, the floating gate thin film transistor FTFT is turned off because the channel resistance of a few MΩ (megaohms) is sustained when a voltage between the drain and the source is a normal drive voltage range of about −20V<Vds<20V. Accordingly, the normal drive voltage applied to the test pad 102 can be applied to the picture display part.

In this way, in the test pad part illustrated in FIG. 10, in the event that the static electricity flows into the test pad 102, the first static electricity prevention circuit 108 and the second static prevention circuit 109 are driven so that the static electricity is bypassed to the first and second drive voltage supply lines VSSL and VDDL, and at the same time, bypassed to the shorting bar 104. Further, the static electricity flowing into the test pad 102 is bypassed to the shorting bar 104 through the resistor R. Accordingly, the static electricity through the test pad 102 can be prevented from flowing into the liquid crystal display panel, thereby protecting the picture display part from the static electricity.

The test pad 102 has a structure where the test pad 102 is connected to the shorting bar 104 through the second static electricity prevention circuit 109 and the resistor R after a scribing process, in which a plurality of liquid crystal display panels manufactured in a body are separated one by one in accordance with the scribing line SCL. Accordingly, in an inspection process after the scribing process, the first and second static electricity prevention circuits 108 and 109 can also intercept the static electricity inflow through the test pad 102.

The test pad 102 is electrically separated from the first and second static prevention circuits 108, 109 and the signal lines of the picture display part in a grinding process during which the shorting bar 104 is removed along a grinding line GRL. To this end, a link line 106 electrically connecting the test pad 102 with a node N1 between the first and second static electricity prevention circuits 108 and 109 extends from the test pad 102 in the outside of the grinding line GRL to be connected to a node N1 located between the test pad 102 and the picture display part (not shown). Accordingly, the link line 106 made open by the grinding process to cause the test pad 102 to be electrically separated from the signal lines of the picture display part and at the same time to be electrically separated from the first and second static electricity prevention circuits 108 and 109. In this way, since the test pad 102 is separated electrically, the static electricity inflow into the liquid crystal display panel through the test pad 102 is prevented after the grinding process.

Figure 11A:
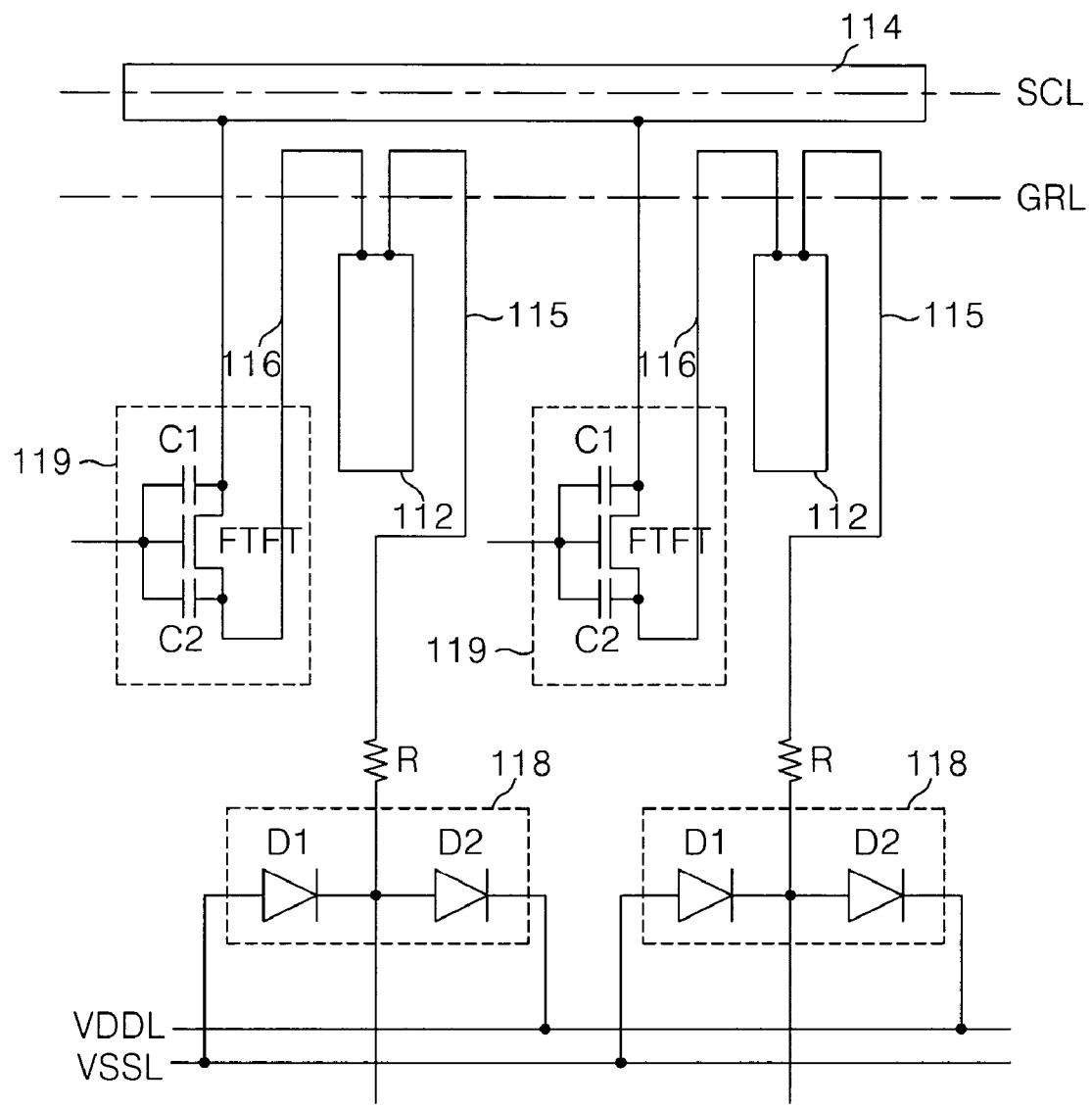
FIG. 11A is a diagram illustrating a test pad part of a liquid crystal display panel according to a fifth embodiment of the present invention.
Figure 11B:
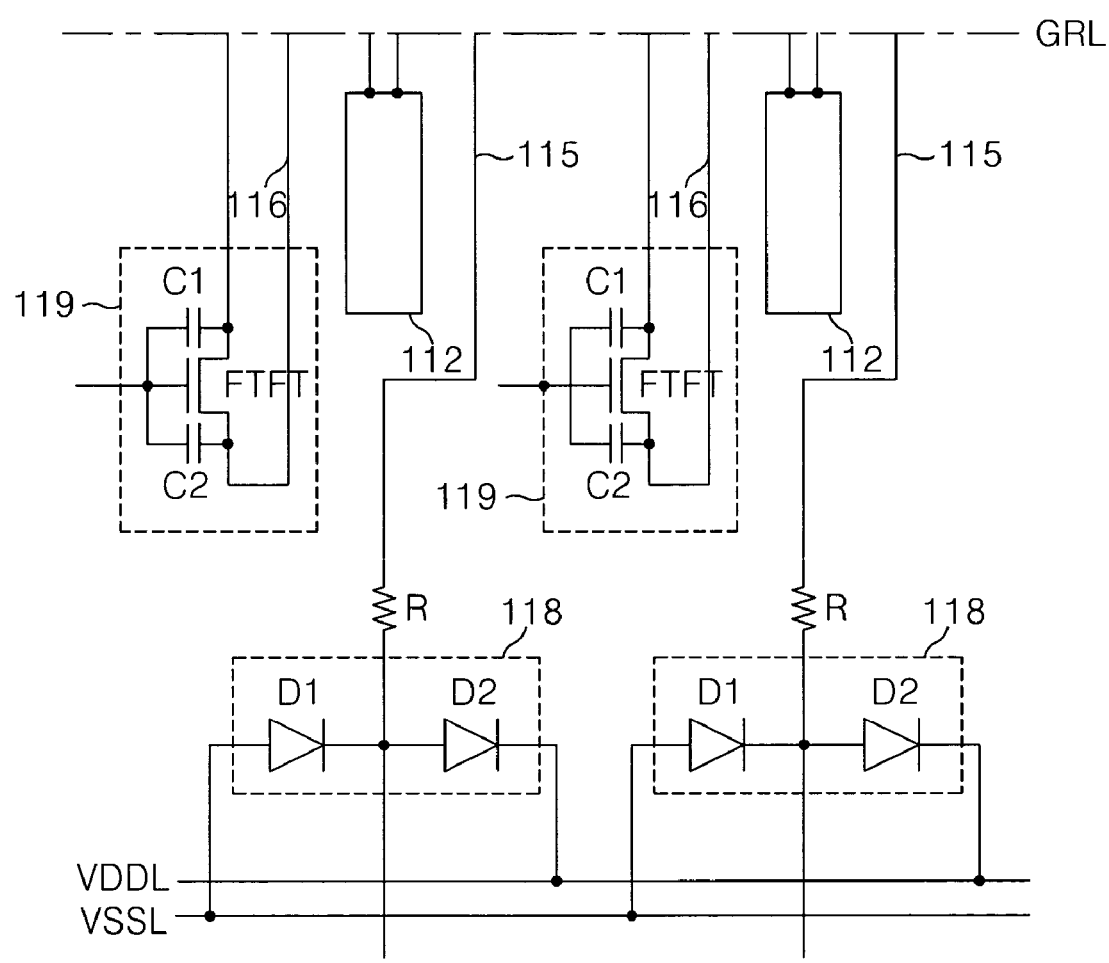
FIG. 11B is a diagram illustrating a test pad part illustrated in FIG. 11A after a grinding process.

FIG. 11A illustrates a test pad part of a static electricity prevention type liquid crystal display panel according to a fifth embodiment of the present invention. FIG. 11B illustrates a test pad part after a grinding process.

The test pad part illustrated in FIG. 11A includes the same components as the test pad part shown in FIG. 8A except that the first and second static electricity prevention circuits 118 and 119 are connected to the test pad 112 through different link lines 115 and 116 instead of a single link line.

The test pads 112 are connected to the signal lines of the picture display part (not shown). The test pads 112 are used to apply a test signal in inspection processes such as a lighting-up test of the liquid crystal display panel, and at the same time to apply a bias voltage in an aging process for stabilizing the liquid crystal display panel.

The first static electricity prevention circuit 118 is connected between the test pad 112 and the first and second drive voltage supply lines VSSL and VDDL. More specifically, the first static electricity prevention circuit 118 includes a first diode D1 connected between the first drive voltage supply line VSSL and a first link line 115 connected to the test pad 112, and a second diode D2 connected between the second drive voltage supply line VDDL and the first link line 115 connected to the test pad 112. The first static electricity prevention circuit 118 is driven when the static electricity flows in through the test pads 112 such that static electricity does not flow into the liquid crystal display panel but is bypassed through the first and second drive voltage supply lines VDDL and VSSL. Accordingly, the first static electricity prevention circuit 118 protects the picture display part in the liquid crystal display panel from the static electricity.

The second static electricity prevention circuit 119 is connected between the test pad 112 and the shorting bar 114. The second static electricity prevention circuit 119 connects the test pad 112 with the shorting bar 114 when a static electricity of high voltage flows in through the test pad 112 to cause an equipotential to be formed with respect to the static electricity among the test pads 112. Accordingly, the static electricity flowing into the test pad 112 is bypassed to the shorting bar 114 that forms the equipotential therewith. To this end, the second static electricity prevention circuit 119 includes a floating gate thin film transistor FTFT having its gate terminal in a floating state, its source terminal connected to the test pad 112 through the second link line 116 and its drain terminal connected to the shorting bar 114; a first capacitor C1 connected between the gate terminal and the drain terminal; and a second capacitor C2 connected between the gate terminal and the source terminal.

The gate terminal of the floating gate thin film transistor FTFT maintains a floating state in which the gate terminal is not connected to a bias line. Thus the voltage of the gate terminal is changed in accordance with the voltage of the source terminal or the drain terminal. In other words, a floating gate voltage Vg has a proportional relationship with the voltage Vds between the drain and the source. As shown in the above FORMULA 1, the proportional rate thereof is determined by the capacitance of the first and second capacitors C1 and C2.

Accordingly, when the static electricity flows through the test pad 112 to apply a high voltage to the source terminal, the gate voltage rises to turn on the floating gate thin film transistor FTFT. In other words, the floating gate thin film transistor FTFT is turned on because a channel resistance is reduced remarkably when a high voltage (e.g., hundreds or more volts) is applied between the drain and the source. Accordingly, the static electricity flowing into the test pad 112 is bypassed to the shorting bar 114 through the turned-on floating gate thin film transistor FTFT.

To the contrary, the floating gate thin film transistor FTFT is turned off when a normal drive voltage is applied through the test pad 112. In other words, the floating gate thin film transistor FTFT is turned off because the channel resistance of a few MΩ (megaohms) is sustained when a voltage Vds between the drain and the source is a normal drive voltage range of about $-20V<Vds<20V$. Accordingly, the normal drive voltage applied to the test pad 112 can be applied to the picture display part.

In this way, in the test pad part illustrated in FIG. 11A, when the static electricity flows into the test pad 112, the first static electricity prevention circuit 118 and the second static electricity prevention circuit 119 are driven so that the static electricity is bypassed to the first and second drive voltage supply lines VSSL and VDDL, and at the same time bypassed to the shorting bar 114. Accordingly, the static electricity through the test pad 112 can be prevented from flowing into the liquid crystal display panel, thereby protecting the picture display part from the static electricity.

The resistor R connected between the test pad 112 and the first static electricity prevention circuit 118 limits the current flowing to the picture display part (not shown). Accordingly, in the event that the static electricity flowing into the test pad 112 is not completely bypassed through the first and second static electricity prevention circuits 118 and 119 but flows into the picture display part, the current limit resistor R can minimize the influence of the static electricity on the picture display part. Herein, it is preferable for the current limit resistor R to have a resistance within the range of about 10 kΩ~1 MΩ.

The test pad 112 has a structure where the test pad 112 is connected to the shorting bar 114 through the second static electricity prevention circuit 119 after a scribing process, in which a plurality of liquid crystal display panels manufactured in a body are separated one by one in accordance with the scribing line SCL. Accordingly, in an inspection process after the scribing process, the first and second static electricity prevention circuits 118 and 119 can also intercept the static electricity inflow through the test pad 112.

The test pad 112, as shown in FIG. 11B, is electrically separated from the first and second static prevention circuits 118, 119 and the signal lines of the picture display part (not shown) in a grinding process where the shorting bar 114 is removed along a grinding line GRL. To this end, a first portion of the first link line 115 connecting the first static electricity prevention circuit 118 and the test pad 112 extends parallel to the test pad 112 and above the test pad 112, then bends in the outside of the grinding line GRL to be connected to the test pad 112 so that a second portion of the first link line 115 extends parallel to the first portion of the first link line 115 to be connected to the first static electricity prevention circuit 118 located between the test pad 112 and the picture display part. A first portion of the second link line 116 connecting the second static electricity prevention circuit 119 and the test pad 112 extends parallel to the test pad 112 and above the test pad 112, then bends in the outside of the grinding line GRL to be connected to the test pad 112 so that a second portion of the second link line 116 extends parallel to the first portion of the second link line 116 to be connected to the second static electricity prevention circuit 119 located below the test pad 112 (in the context of the figure). Accordingly, the first and second link lines 115 and 116 are made open by the grinding process to cause the test pad 112 to be electrically separated from the signal lines of the picture display part and at the same time to be electrically separated from the first and second static electricity prevention circuits 118 and 119. In this way, since the test pad 112 is separated electrically, the static electricity inflow into the liquid crystal display panel through the test pad 112 is prevented after the grinding process.

As described above, the static electricity prevention type liquid crystal display panel according to the present invention, when the static electricity flows into the pad part, drives the first static electricity prevention circuit and the second static electricity prevention circuit including the floating gate thin film transistor. Accordingly, the static electricity flowing into the pad is bypassed to the first and second drive voltage supply lines and at the same time is by passed to the shorting bar forming the equipotential therewith, so that the static electricity can be prevented from damaging the picture display part, wherein the damage is caused when the static electricity flows into the panel.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display for preventing static electricity, comprising:
   a picture display part having a plurality of liquid crystal cells;
   a signal pad part for applying a driving signal to be inputted to signal lines of the picture display part,
   wherein the signal pad part includes:
      a plurality of pads connected to respective ones of the signal lines; and
      a static electricity prevention circuit having a thin film transistor with a floating gate for connecting at least one of said pads with an equipotential line in the presence of static electricity; and
   a link line connecting the one of said pads to the thin film transistor respectively,
   wherein the link line is connected to a node between an outer edge of the picture display part and thin film transistor, and to an outer edge of the one of said pads near to the equipotential line.

2. The liquid crystal display according to claim 1, wherein the static electricity prevention circuit causes the one of said pads to be insulated from the equipotential line and the other pads when the driving signal is applied to the one of said pads so as to apply the driving signal to the signal lines of the picture display part.

3. The liquid crystal display according to claim 1, the static electricity prevention circuit, further comprising:
   a first capacitor connected between the floating gate and a first terminal of the thin film transistor connected to the equipotential line; and
   a second capacitor connected between the floating gate and a second terminal of the thin film transistor connected to the one of said pads.

4. The liquid crystal display according to claim 1, further comprising:
   a second static electricity prevention circuit formed between the one of said pads and a first drive voltage supply line and a second drive voltage supply line for bypassing the static electricity flowing from the one of said pads into at least one of the first and second drive voltage supply lines.

5. The liquid crystal display according to claim 1, wherein the link line has a first portion between a grinding line and the equipotential line.

6. The liquid crystal display according to claim 5, wherein the link line further comprises a second portion spaced apart from the first portion and having a first part outside the grinding line and a second part between the grinding line and the static electricity prevention circuit.

7. A liquid crystal display for preventing static electricity, comprising:
   a picture display part having a plurality of liquid crystal cells;
   a signal pad part for applying a driving signal to be inputted to signal lines of the picture display part,
   wherein the signal pad part includes:
      a plurality of pads connected to respective ones of the signal lines;
      a static electricity prevention circuit having a thin film transistor with a floating gate for connecting at least one of said pads with an equipotential line in the presence of static electricity;
      a link line connecting the one of said pads to the thin film transistor respectively, wherein the link line is connected to a node between an outer edge of the picture display part and thin film transistor, and to an outer edge of the one of said pads near to the equipotential line; and
      a second static electricity prevention circuit formed between the one of said pads and a first drive voltage supply line and a second drive voltage supply line for bypassing the static electricity flowing from the one of said pads into at least one of the first and second drive voltage supply lines;
   wherein the link line has a first portion between a grinding line and the equipotential line.

8. The liquid crystal display according to claim 7, wherein the link line further comprises a second part between the grinding line and the static electricity prevention circuit.

9. The liquid crystal display according to claim 5, wherein the one of said pads is electrically separated from the static electricity prevention circuit, the second static electricity prevention circuit, and the signal lines of the picture display part by the grinding process in which the equipotential line is removed.

10. The liquid crystal display according to claim 8, wherein the one of said pads is electrically separated from the static electricity prevention circuit, the second static electricity prevention circuit, and the signal lines of the picture display part by the grinding process in which the equipotential line is removed.

11. The liquid crystal display according to claim 1, further comprising:
at least one resistor connected between the static electricity prevention circuit and the picture display part for limiting current.

12. The liquid crystal display according to claim 7, further comprising:
at least one resistor connected between the one of said pads and the picture display part for limiting current.

13. The liquid crystal display according to claim 1, further comprising:
at least one resistor connected between the one of said pads and the equipotential line.

14. The liquid crystal display according to claim 1, wherein the signal pad part includes:
a link pad part having a plurality of link pads that connect the signal lines of the picture display part with a drive circuit.

15. The liquid crystal display according to claim 14, wherein the signal pad part includes:
a test pad part having a plurality of test pads connected to the signal lines of the picture display part for inspecting the liquid crystal display panel.

16. A method for preventing static electricity during manufacture of a liquid crystal display device, comprising:
providing a picture display part having a plurality of liquid crystal cells;
providing a signal pad part for applying a driving signal to be inputted to signal lines of the picture display part,
wherein the signal pad part includes a plurality of pads connected to respective ones of the signal lines, a static electricity prevention circuit having a thin film transistor with a floating gate for connecting at least one of said pads with an equipotential line in the presence of static electricity, and a link line connecting the pads to the thin film transistor respectively,
wherein the link line is connected to a node between an outer edge of the picture display part and thin film transistor, and to an outer edge of the one of said pads near to the equipotential line.

17. The method according to claim 16, wherein the static electricity prevention circuit causes the one of said pads to be insulated from the equipotential line and the other pads when the driving signal is applied to the one of said pads so as to apply the driving signal to the signal lines of the picture display part.

18. The method according to claim 16, wherein the static electricity prevention circuit includes:
a first capacitor connected between the floating gate and a first terminal of the thin film transistor connected to the equipotential line; and
a second capacitor connected between the floating gate and a second terminal of the thin film transistor connected to the one of said pads.

19. The method according to claim 16, wherein the signal pad part further includes a second static electricity prevention circuit formed between the one of said pads and a first drive voltage supply line and a second drive voltage supply line for bypassing the static electricity flowing from the one of said pads into at least one of the first and second drive voltage supply lines.

20. The method according to claim 19, wherein the link line has a first portion between a grinding line and the equipotential line.

21. The method according to claim 20, wherein the link line further comprises a second portion spaced apart from the first portion and having a first part outside the grinding line and a second part between the grinding line and the static electricity prevention circuit.

22. The method according to claim 16, wherein the one of said pads is connected to a node between the static electricity prevention circuit and the picture display part.

23. A method for preventing static electricity during manufacture of a liquid crystal display device, comprising:
providing a picture display part having a plurality of liquid crystal cell;
providing a signal pad part for applying a driving signal to be inputted to signal lines of the picture display part,
wherein the signal pad part includes a plurality of pads connected to respective ones of the signal lines, a static electricity prevention circuit having a thin film transistor with a floating gate for connecting at least one of said pads with an equipotential line in the presence of static electricity, and a link line connecting the one of said pads to the thin film transistor respectively,
wherein the link line is connected to a node between an outer edge of the picture display and thin film transistor, and to an outer edge of the one of said pads near to the equipotential line,
wherein the signal pad part further includes a second static electricity prevention circuit formed between the one of said pads and a first drive voltage supply line and a second drive voltage supply line for bypassing the static electricity flowing from the one of said pads into at least one of the first and second drive voltage supply lines; and
wherein the link line has a first portion between a grinding line and the equipotential line.

24. The method according to claim 23, wherein the link line further comprises a second part between the grinding line and the static electricity prevention circuit.

25. The method according to claim 20, wherein the one of said pads is electrically separated from the static electricity prevention circuit, the second static electricity prevention circuit, and the signal lines of the picture display part by the grinding process in which the equipotential line is removed.

26. The method according to claim 21, wherein the one of said pads is electrically separated from the static electricity prevention circuit, the second static electricity prevention circuit, and the signal lines of the picture display part by the grinding process in which the equipotential line is removed.

27. The method according to claim 16, further comprising:
providing at least one resistor connected between the static electricity prevention circuit and the picture display part for limiting current.

28. The method according to claim 16, further comprising:
providing at least one resistor connected between the one of said pads and the picture display part for limiting current.

29. The method according to claim 16, further comprising:
providing at least one resistor connected between the one of said pads and the equipotential line.

30. The liquid crystal display according to claim 16, wherein the signal pad part includes:
a test pad part having a plurality of test pads connected to the signal lines of the picture display part for inspecting the picture display part.

* * * * *